UNITED STATES PATENT OFFICE 2,420,453

ACYLAMINO-ANTHRAQUINONE VAT DYESTUFFS

Paul Sutter, Binningen, and Walter Kern, Sissach, Switzerland, assignors to Society of Chemical Industry in Basle, Basel, Switzerland, a Swiss firm No Drawing. Application January 23, 1945, Serial No. 574,207. In Switzerland January 12, 1944

3 Claims. (Cl. 260—377)

Some di-(benzoylamino)-anthraquinones are valuable vat dyestuffs. Especially 1:5-di-(benzoylamino)-anthraquinone is a well known commercial dyestuff of yellow shade. However it has certain drawbacks and the most important one is that this dyestuff is not suitable for being dyed at normal temperature, viz. about 40–50° C., but requires a low dyeing temperature of about 25–30° C.; otherwise it does not give its full strength on dyeing. Even if dyed at low temperature the dyeings obtained therewith are rather feeble.

It is an object of the present invention to provide new dyestuffs possessing improved properties. It is a further object of the present invention to provide dyestuffs of the di-(acylamino)-anthraquinone series, which are suitable for being dyed at medium temperature, viz., about 40–50° C., thereby yielding strong shades. Further objects will appear as the specification proceeds.

It has been found that valuable vat dyestuffs can be obtained by causing diaminoanthraquinones whose amino groups are mainly in 1- and 5-position to react with para-chloro- or para-bromobenzoic acids or their functional derivatives to form acid amides.

Among the diaminoanthraquinones serving as starting materials for the present process there can also be used, besides pure 1:5-diaminoanthraquinone, technical mixtures of 1:5-diaminoanthraquinone with other products, such as 1:8-diaminoanthraquinone, in which the first named component is highly predominant, or the second component is present only as an impurity.

The para-chloro- or para-bromobenzoic acids serving also as starting materials may contain still further substituents, for example halogen, methyl groups or similar substituents usually found in vat dyestuffs. Especial mention is made of 3:4-dichlorobenzoic acid.

The para-chloro- or para-bromobenzoic acids are used for the reaction with the said diaminoanthraquinones preferably in the form of reactive functional derivatives, for example as acid halides. The reaction can take place in known manner in high boiling solvents, if desired by using acid binding agents, such as sodium carbonate and pyridine.

A modification of this process which leads to the same final products consists in causing the corresponding dihalogen anthraquinones to react with para-chloro- or para-bromobenzamide.

The products obtained by the present process can be used in known manner for dyeing and printing a great variety of materials, especially fibers containing cellulose, such as cotton, linen, artificial silk and staple fiber from regenerated cellulose. The dyeings obtained therewith are distinguished by a good color strength and fastness to light. It must also be pointed out that 1:5-di-(para-chlorobenzoyl)-aminoanthraquinone can be dyed advantageously at a medium dyeing temperature (40–50° C.).

The present dyestuffs can also be converted in known manner into leuco-ester salts and used in that form for dyeing and printing by the usual methods employed for this class of dyestuffs.

The following examples illustrate the invention, the parts being by weight:

Example 1

23.8 parts of 1:5-diaminoanthraquinone are heated to boiling in 300 parts of ortho-dichlorobenzene, while stirring. A solution of 35 parts of para-chlorobenzoyl-chloride in 100 parts of ortho-dichlorobenzene is then added thereto. The mixture is further heated to boiling for two hours, then cooled, suction-filtered and the dyestuff is washed out with some ortho-dichlorobenzene and then with alcohol. After drying the dyestuff of the formula

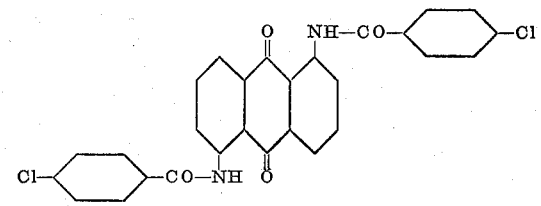

is obtained in the form of yellow brown crystals. It dyes cotton from a violet red vat very fast yellow shades.

A very similar dyestuff is obtained when replacing the 35 parts of para-chlorobenzoyl-chloride by 44 parts of para-bromobenzoylchloride.

When replacing the para-chlorobenzoylchloride by the corresponding quantity of 3:4-dichlorobenzoylchloride, there is also obtained a similar dyestuff of the formula

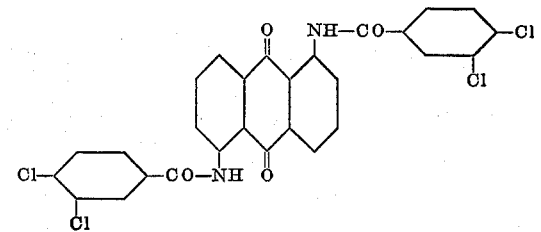

In an analogous manner 4-chloro-3-bromobenzoic acid chloride or 4-bromo-3-chlorobenzoic acid chloride may be condensed with 1:5-diaminoanthraquinone. Furthermore asymmetrical dyestuffs may be made by first condensing one molecular proportion of 1:5-diaminoanthraquinone with one molecular proportion of one para-halogen-benzoylchloride (e. g. para-chlorobenzoylchloride) and then with one molecular proportion of another para-halogen-benzoylchloride (e. g. 3:4-dichlorobenzoylchloride).

*Example 2*

2 parts of para-chlorobenzamide are dispersed in 120 parts of nitrobenzene together with 1.8 parts of 1:5-dichloroanthraquinone, 0.7 part of anhydrous sodium carbonate, 0.7 part of anhydrous sodium acetate and 0.1 part of anhydrous copper acetate, and heated to 160° C. The whole is heated to boiling within 3 hours, boiled for 3 hours and then cooled. After filtering and washing out there is obtained a crystalline powder which can be purified in usual manner with sodium hypochlorite. The dyestuff dyes cotton from a violet-red vat yellow shades and corresponds to the dyestuff described in the first paragraph of Example 1.

*Example 3*

1 part of the dyestuff obtained according to Example 1, first paragraph, is dissolved in 10 parts of concentrated sulfuric acid and precipitated by introducing into much water. After suction-filtering and washing out, the filter cake is stirred with 100 parts of water, 4 parts by volume of caustic soda solution of 36° Bé. are added and vatting is effected by addition of 2 parts of sodium hydrosulfite at about 50° C. This stock vat is added to a dye-bath of 3000 parts of water containing 8 parts of caustic soda solution of 36° Bé. and 2.5 parts of sodium hydrosulfite. 100 parts of cotton are entered at 40° C., 30 parts of sodium chloride are added to the bath and dyeing is continued for 1 hour at 40–50° C. The cotton is then centrifuged, oxidized, and finished as usual. It is dyed fast yellow shades.

What we claim is:

1. A vat dyestuff of the general formula

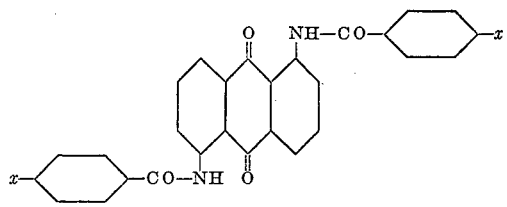

wherein $x$ stands for a member of the group consisting of chlorine and bromine.

2. The vat dyestuff of the formula

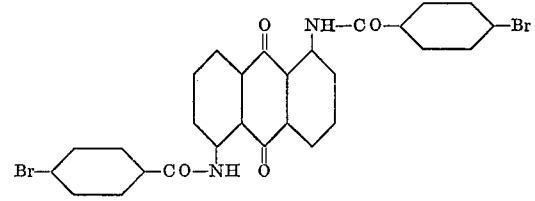

3. The vat dyestuff of the formula

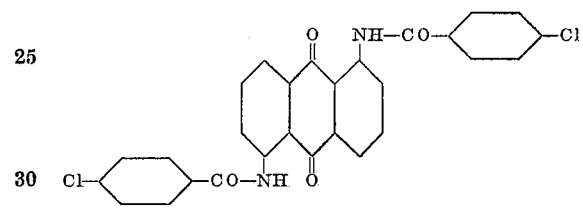

PAUL SUTTER.
WALTER KERN.

REFERENCES CITED

The following references are of record in the file of this patent:

UNITED STATES PATENTS

| Number | Name | Date |
|---|---|---|
| 2,122,882 | Herrett | July 5, 1938 |
| 2,346,726 | Buxbaum | Apr. 18, 1944 |

FOREIGN PATENTS

| Number | Country | Date |
|---|---|---|
| 2,702 | Great Britain | 1909 |
| 11,932 | Great Britain | 1909 |
| 478,046 | Germany | June 19, 1929 |
| 55,059 | Austria | Apr. 15, 1912 |